Jan. 15, 1924.

P. BOURGARD 1,481,046

FREE WHEEL AND BRAKE HUB FOR BICYCLES

Filed April 5, 1923

Inventor
Prosper Bourgard
per
Attorney.

Patented Jan. 15, 1924.

1,481,046

UNITED STATES PATENT OFFICE.

PROSPER BOURGARD, OF DOLHAIN, BELGIUM.

FREE-WHEEL AND BRAKE HUB FOR BICYCLES.

Application filed April 5, 1923. Serial No. 630,177.

*To all whom it may concern:*

Be it known that I, PROSPER BOURGARD, a subject of the King of the Belgians, residing at Dolhain, Belgium, Rue Moulin en Rhuyff, have invented a new and useful Improvement in Free-Wheel and Brake Hubs for Bicycles, of which the following is a specification.

The present invention relates to an improved free-wheel and brake hub for bicycles and more particularly has for its main object to provide a hub of the kind referred to which will be simpler and easier of construction and more satisfactory in operation than the known types of such hubs, and which will admit of its parts being more readily taken to pieces and assembled and will make it possible to obtain a better lubrication by permitting the use of vaseline or the like as a lubricant.

With these and other objects of lesser importance in view, the invention more particularly consists of a novel combination and arrangement of specific parts of which the main element is constituted by a segmentary nut through the medium of which the driving free-wheel and brake actions are obtained, and which is for the purpose provided internally with screw-threads of triangular or substantially equivalent section and arranged to cooperate with a correspondingly threaded sleeve having the chain pinion which receives the operative impulsion fitted thereon, one of the essential features of the invention consisting therein that the said segmentary nut is capable both of longitudinal movement in relation to the sleeve referred to and of having its segments forced radially against the inner surface of the hub casing.

In order that the invention may be more readily understood, one embodiment of same is, by way of example only, illustrated by the accompanying drawing, wherein:

Figs. 4 and 5 are respectively a side and an end view of a toothring forming a part of the hub referred to.

Figure 1:
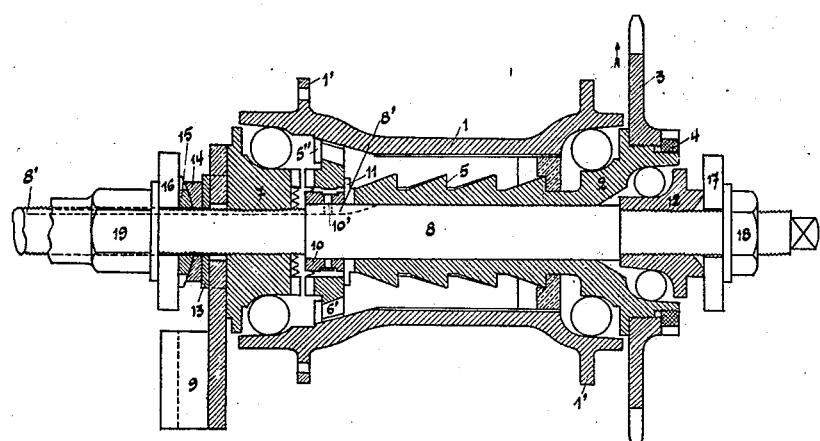
Fig. 1 is a longitudinal section through one form of the improved hub according to the invention.

Referring to the drawing, 1 indicates a hub casing of which the end portions are suitably formed internally to form outer ball races for the ball bearings, the bore of the said hub casing 1 being cylindrical except adjacent one end, to the left hand side of Fig. 1, where it is made conical. It is to the outer flanges 1' of this hub-casing 1 that the spokes connecting the hub to the rim of the wheel are secured.

2 indicates a sleeve mounted on the axle 8, provided with a double right handed screw thread of triangular section and which forms towards one end, a cone constituting an inner ball-race for a ball-bearing. The said end of the sleeve 2 is further provided with a right handed screw thread to receive the chain pinion 3 and with a left handed screw thread to receive a locknut 4 which prevents the chain pinion 3 from becoming loose.

Figure 2:
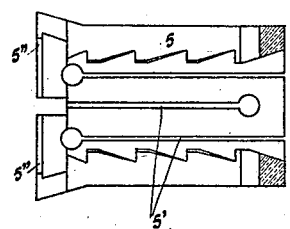
Figs. 2 and 3 are respectively a longitudinal section through and an end view of the segmentary nut.
Figure 3:
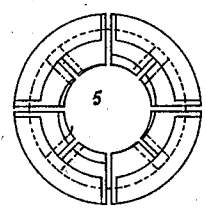

5 indicates a segmentary nut preferably made of gun metal, this nut having a plurality of longitudinal slots 5' cut therein at intervals on its circumference (see Figs. 2 and 3) so as to divide said circumference into a number of segments forming each an arc of a circle. The said slots 5' are made to start alternately from one end and the other of the nut 5 to finish near the respectively opposite end; i. e. they are in staggered formation, and one of the said slots preferably runs right through the whole length of the nut in order to increase the elasticity thereof in a radial direction.

Figures 4, 5:
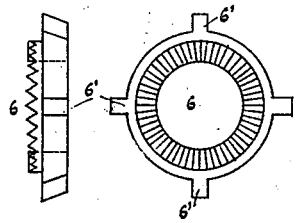

The said nut 5 is provided internally with a double right handed screw-thread of triangular section engaging the screw thread of the sleeve 2, and has one end made conical as shown to fit the corresponding conical portion of the hub casing 1. In this conical end of the nut 5 the slots 5' are made wider to receive radial projections 6' provided on a steel tooth ring illustrated in detail by Figs. 4 and 5. The conical bore of the said end of the nut 5 is made to suit the conical surface of the steel ring 6 between the projections 6', and the end in question of the nut 5 further has a circular flange 5'' adapted to retain the said tooth ring 6 when the latter is introduced into the corresponding space within the conical end of the aforesaid nut 5. This introduction is made possible owing to the elasticity due to the nut 5 being segmented. The toothring 6 is thus compelled to follow the movements of the segmentary nut 5 both rotatively (owing to the engagement of the projections 6' in the widened ends of the corresponding slots 5') and longitudinally (owing to the engagement of the periphery of the annular faces of the ring 6 with the annular shoulder at the bottom of the conical bore of the nut 5 and the circular flange 5" of said nut respectively).

7 indicates a cone screwed onto the axle 8 and forming the inner ball-race for the ball-bearing to the left hand side of Fig. 1: this cone 7 has its face adjacent the conical end of the nut 5 cut to form teeth capable of engaging those of the toothring 6, and the outer face of the cone 7 has a diametral groove formed therein to receive a lever arm 9 by means of which it is rigidly connected to the frame of the bicycle. As a consequence, the cone 7 is maintained stationary. The axle 8 has a longitudinal groove 8' formed therein to receive a pin 10' provided to prevent the rotation of a ring 10 fitted on the axle 8 within the toothring 6. The said ring 10 has its outer periphery formed with a circumferential groove in which is located a blade spring 11 having one of its ends free and which almost entirely surrounds the ring 10 and exerts a slight pressure on the inner periphery of the toothring 6.

12 indicates a cone forming the inner ball-race for the ball-bearing within the end of the sleeve 2 carrying the chain pinion 3, the said cone 12 being here shown screwed onto the axle 8; it may however be made in one piece with the said axle.

13 indicates a thin washer having a small projection engaging the longitudinal groove 8' of the axle 8, and 14 is a washer having a concave surface against which bears the convex surface of a nut 15 screwed onto the corresponding end of the axle 8.

The nut 15 in cooperation with the washers 14 and 13 serves to maintain the parts of the hub in position in relation to the cone 12 on the opposite end of the axle and thus prevents said parts from becoming ill-adjusted.

16 and 17 indicate the brackets formed at the ends of the corresponding frame member of the bicycle to carry the rear axle, which is maintained by means of the nuts 18 and 19, this latter nut having the usual extension to provide a step for the cyclist's foot when mounting onto the bicycle.

The operation of the above described improved hub is the following:

Referring to Fig. 1, which shows the normal position of the parts, i. e. the position when it is desired to drive the rear wheel of the cycle, the chain pinion 3, driven through the medium of the chain, causes the rotation of the sleeve 2 of which the double right handed thread draws the segmentary nut 5 towards the right until its conical end fits snugly in the corresponding portion of the hub casing 1 and thus causes through friction the rotation of the said hub casing and thus of the wheel. The wheel is thus positively driven.

When the cyclist stops pedaling and the chain pinion 3 consequently stops rotating, the hub casing 1, owing to the impulsion received, continues rotating for a time and therefore momentarily causes the segmentary nut 5 to continue following its movement of rotation but, as the sleeve 2 has stopped rotating simultaneously with the chain pinion 3 the said segmentary nut owing to the engagement of the male and female triangular screw threads of the sleeve 2 and the nut 5 respectively moves towards the left and its conical end becomes disengaged from the corresponding conical portion of the bore of the hub casing 1 so that the latter is able to rotate as a free-wheel. If, in order to obtain a brake action, the cyclist pushes the pedals backwards, the chain pinion 3 causes the sleeve 2 to rotate in a direction which owing to the double triangular screw thread thereof being right handed causes the segmentary nut 5 to move towards the left until stopped from moving further by a suitable abutment constituted by that face of the cone 7 which is provided with teeth, with which the teeth of the toothring 6 fitted in the conical end of the nut 5 snap into engagement and as in consequence the segmentary nut 5 is then unable either to rotate or to move any further to the left while on the other hand the triangular screw thread tends to impart to it such further movement, the sloping portions of the female thread of the segmentary nut are so to speak caused to "climb" on the sloping portion of the male thread of the sleeve 2, which results in the segments of the nut 5 being forced radially towards and against the inner cylindrical surface of the hub casing 1 so as to stop the latter's rotation by friction: the brake action is thus obtained. When subsequently the chain pinion 3 is rotated in the initial direction the segmentary nut 5, owing to its elasticity and to the cooperation of its triangular screw thread with that of the sleeve 2, will return to the position indicated in Fig. 1.

The spring 11 is provided to exert a suitable braking action on the nut 5 to stop the tendency to continued rotation thereof when becoming disengaged from the conical portion of the hub casing. The engagement of the toothring 6 with the teeth of the cone 7 is thus rendered impossible when the cyclist makes free-wheel. This spring 11 further prevents the nut 5 from rotating together with the sleeve 2 on back-pedaling to obtain the brake action; the rotation of the nut 5 being thus stopped the triangular screw thread causes same to move towards the left.

I claim:

1. In a free-wheel and brake hub for bicycles, the combination of a hub-casing; a sleeve provided externally with screw threads of triangular section, mounted on the axle and having one end fitted with a chain pinion; a segmentary nut within aforesaid casing having a plurality of longitudinal slots at intervals on its circumference extending along the greater portion of its length starting alternately from one end and the other, and provided internally with screw-threads of triangular section engaging those of the aforesaid sleeve, substantially as described.

2. In a free-wheel and brake-hub for bicycles, the combination of a hub-casing; a sleeve provided externally with screw threads of triangular section, mounted on the axle and having one end fitted with a chain pinion; a segmentary nut within aforesaid casing, having a plurality of longitudinal slots at intervals on its circumference extending along the greater portion of its length starting alternately from one end and the other, and provided internally with screwthreads of triangular section engaging those of the aforesaid sleeve, said segmentary nut having one end made conical and adapted to fit a correspondingly shaped portion of the hub casing; and a toothring removably fitted in said conical end of the segmentary nut and capable of engagement with corresponding teeth cut in one face of a stationary element rigidly connected to the bicycle frame; substantially as described.

In testimony whereof I signed hereunto my name in the presence of two subscribing witnesses.

PROSPER BOURGARD.

Witnesses:
 ALY BOULANGER,
 YVONNE RIGA.